UNITED STATES PATENT OFFICE.

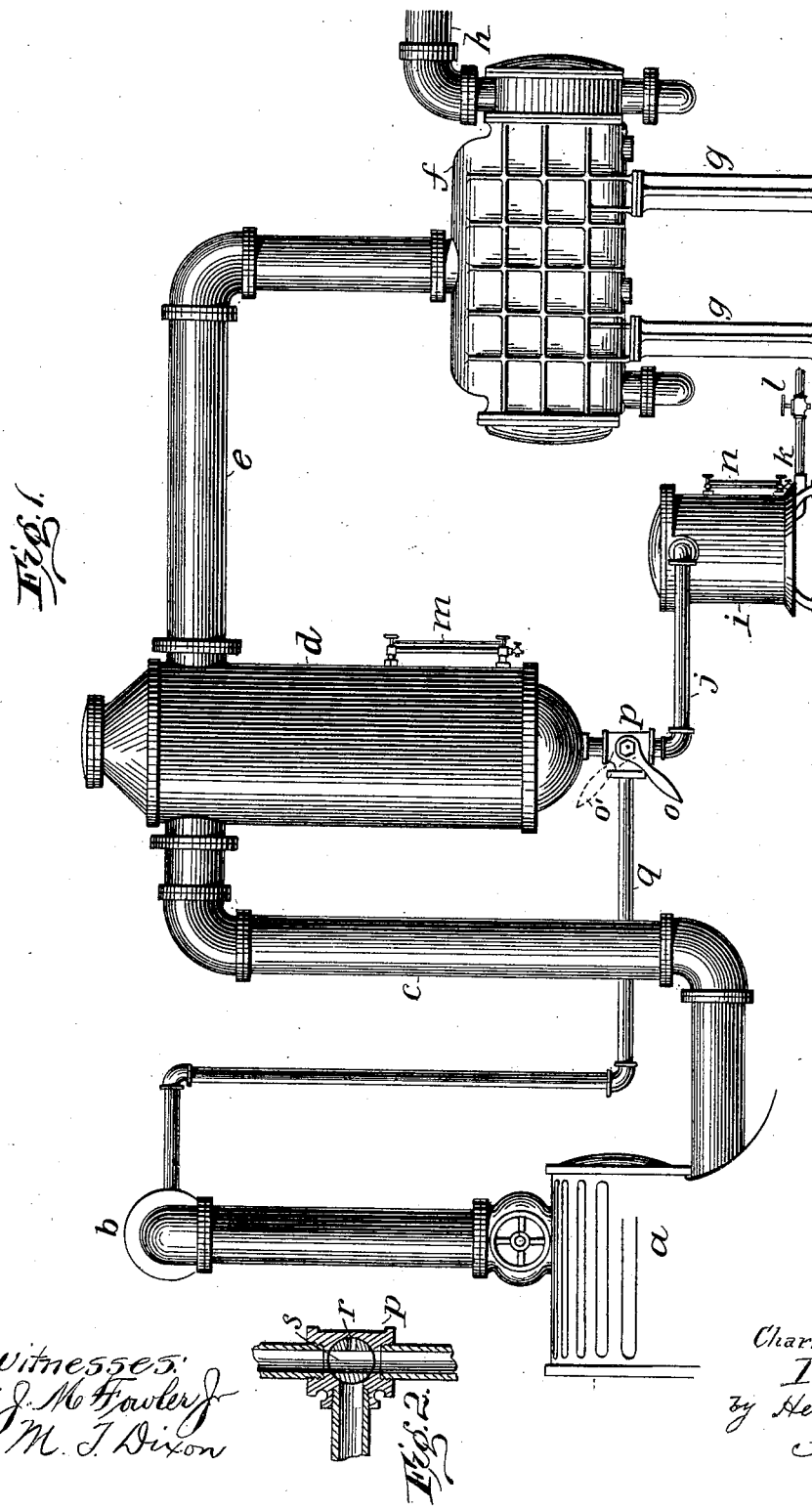

CHARLES HENRY TREAT, OF MANSFIELD, OHIO, ASSIGNOR TO THE DIRECT SEPARATOR COMPANY, OF SYRACUSE, NEW YORK.

ATTACHMENT FOR SEPARATORS.

SPECIFICATION forming part of Letters Patent No. 643,921, dated February 20, 1900.

Application filed August 17, 1899. Serial No. 727,538. (No model.)

*To all whom it may concern:*

Be it known that I, CHARLES HENRY TREAT, a citizen of the United States, residing at 282 North Diamond street, Mansfield, in the county of Richland and State of Ohio, have invented certain new and useful Improvements in Attachments for Separators; and I do hereby declare the following to be a full, clear, and exact description of the invention, such as will enable others skilled in the art to which it appertains to make and use the same.

My invention consists in an improvement in attachments for steam-separators, which have for their object the segregation from the separator of the impurities eliminated thereby from the steam on its passage to the condenser or other place of use and the prevention of the return of said impurities into the separator or into the steam-current and provide for periodically removing said impurities without interfering with the continuous operation of the separator.

My improvement consists in a means for avoiding the admission of air into the system when the impurities are to be discharged, by which admission the vacuum of the condenser is impaired and a regurgitation of oil and impurities into the separator or into the steam-current is liable to take place.

By my said improvement nothing but steam is allowed to enter the cavities of the system, so that no regurgitation is possible, while the aid of steam-pressure is availed of for the positive discharge of the impurities from the receiving-tank instead of relying on the feeble and slow action of gravity.

In the drawings forming a part of this specification, Figure 1 is an elevation showing the separator and its attachment in their relations to the other parts of a steam-purifying system. Fig. 2 is a detail view, in vertical section, showing the internal construction of a three-way valve suitable for use in my improved system.

$a$ represents an engine-cylinder; $b$, a live-steam pipe supplying steam thereto from a suitable steam-generator; $c$, the exhaust-steam pipe of the engine; $d$, the separator, of any suitable construction; $e$, the pipe for purified steam leading from the separator to the condenser, and $f$ the condenser, suitably supported on columns $g$ $g$.

$h$ is a pipe leading to the vacuum-pump.

$i$ is the receiving-tank, communicating with the bottom of the separator by a pipe $j$.

$k$ is the discharge-pipe from the receiving-tank, provided with a cock or valve $l$.

The separator and the receiving-tank are each provided with gage sight-tubes $m$ $n$ for exhibiting the height of the contents in the respective vessels.

In the pipe $j$ is located a three-way valve $p$, having handle $o$. Communicating with pipe $j$ through this valve $p$ is a pipe $q$, leading to a live-steam pipe or to the boiler or other source of live steam.

$r$ $s$ are passages through the rotary portion of the valve.

The operation is as follows: Steam from any source of steam to be purified, as the exhaust-steam pipe of an engine, passes through the pipe $c$ to the separator $d$ on its way to the condenser $f$. The oil and other impurities and the containing water drop by gravity into the receiving-tank $i$, the valve $p$ being in the position shown in the drawings. When the receiving-tank requires discharging, as shown by the gage-glass $n$, the valve $p$ is turned by its handle $o$ one-quarter turn to the position shown by handle $o'$ in dotted lines, Fig. 1. Communication between the separator and the receiving-tank $i$ is thus cut off and at the same time established between receiving-tank $i$ and the pipe $q$, containing live steam, and the cock $l$ being opened the collection of impurities is blown out into any suitable receptacle without any admission of air either into the receiving-tank or into the closed vacuum system. The cross-aperture $r$, which establishes communication between the receiving-tank and the live-steam pipe, may be practically very small to reduce the passage of steam into the receiving-tank to any degree desired, only so much being required as will displace the accumulated contents and expel them from the receiver. When the discharge is accomplished, the cock $l$ is closed, the valve $p$ is restored to its former position, the small amount of steam in the receiving-tank becomes assimilated with that in the vacuum system by the operation of the condenser, and the collection from the separator goes on as before.

I claim and desire to secure by Letters Patent—

1. In an attachment for separators, the combination with the exhaust-steam pipe of an engine, of a separator, a receiving-tank, in communication with said separator, said receiving-tank having a discharge-outlet into the atmosphere, and a means for cutting off said communication and simultaneously establishing communication between said receiving-tank and a source of live steam, substantially as specified.

2. The combination with the exhaust-steam pipe of an engine, of a separator, a receiving-tank having a discharge-outlet into the atmosphere, a pipe connection between said separator and said tank, a pipe from a source of live steam leading into said pipe connection, and a valve at the juncture of said pipes, whereby communication can be established alternately between said separator and tank, and between the said tank and the source of live steam, substantially as specified.

3. The combination with the exhaust-steam pipe of an engine, of a separator, a receiving-tank, pipe $k$ discharging into the atmosphere, cock $l$, connecting-pipe $j$, live-steam pipe $q$, and three-way valve $p$, at the juncture of said live-steam pipe and said pipe $j$, substantially as specified.

4. The combination with the exhaust-steam pipe of an engine, of a separator, a receiving-tank having a discharge-outlet into the atmosphere, with means for controlling the same, a pipe connection between said separator and said tank, having a valve therein, a steam-generator, a live-steam pipe connected with said receiving-tank and with said steam-generator, and means for controlling the admission of steam through said pipe to said tank, substantially as specified.

In testimony whereof I affix my signature in presence of two witnesses.

CHARLES HENRY TREAT.

Witnesses:
L. A. PECK,
GEO. R. MARSHALL.